United States Patent Office 3,406,885
Patented Oct. 22, 1968

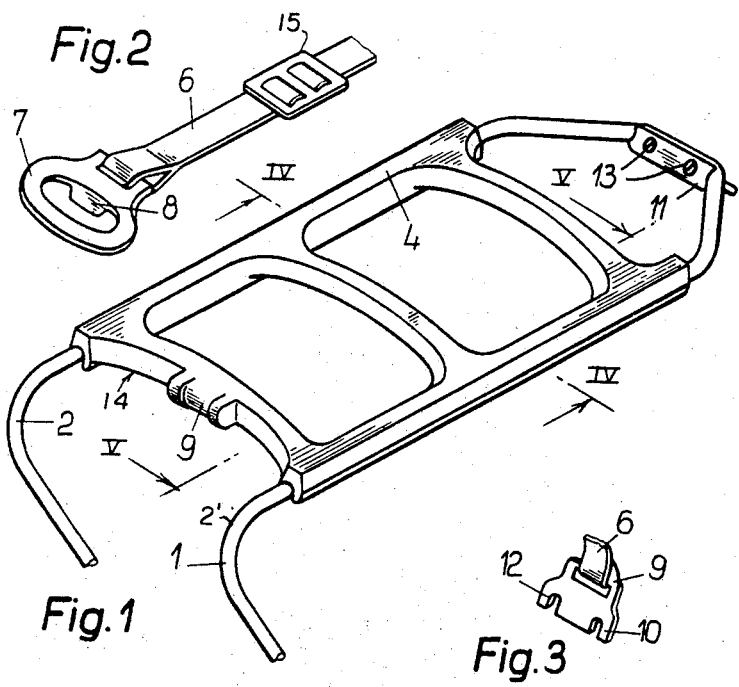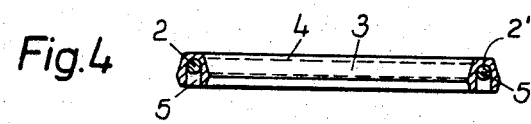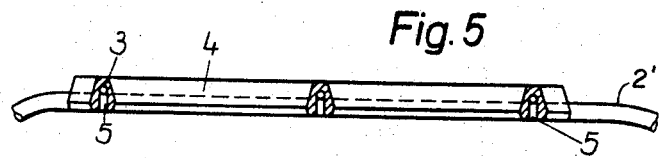

3,406,885
BICYCLE LUGGAGE CARRIER
Emil Zurmuhlen, Brackwede, Westphalia, Germany, assignor to ESGE—Marby G.m.b.H. & Co., Brake, near Bielefeld, Germany, a limited-liability company of Germany
Filed Jan. 11, 1967, Ser. No. 608,575
Claims priority, application Germany, Mar. 18, 1966, E 31,280
4 Claims. (Cl. 224—39)

ABSTRACT OF THE DISCLOSURE

A bicycle luggage carrier, also useable as a seat, particularly for children's bicycles, is covered with a separate plastic covering made of an integral molding, snapped over the carrier structure. To provide for carrying of books and the like, and eliminate a holding spring, a strap is provided which can be secured to the carrier directly by engagement with an integrally molded latch or hook.

---

The present invention relates to a bicycle carrier, and more particularly to a luggage carrier for children's bicycles, which is frequently used, or rather abused, to form an additional seat for a child.

Bicycle carriers, which are also to be used to transport people, and particularly children, have to be made very carefully in order to prevent injury to the user. It has previously been proposed to cover the metal parts, of which such carriers are usually made, with a coating of plastic, and to substitute for the customary cross braces, elastic rubber strips or the like. It has also been proposed to place plastic pieces and rubber strips on the carriers in order to increase the friction of material to be loaded thereon.

The usually rather sharp metal edges, particularly in the regions where pieces are joined, for example, spot welded together continue to cause injuries, even if only minor ones. Such injuries are particularly frequent when a child uses such a carrier as a second seat for another child. The above-referred to rubber strips, or plastic coatings do not, in themselves, avoid such injuries since they do not cover completely all metal parts.

It is an object of the present invention to provide a luggage carrier which is at the same time strong and does not present any sharp metal edges or parts liable to cause injury.

Briefly, in accordance with the present invention, the cycle carrier frame is completely covered by a separate, integral molding of plastic material, formed to match the bicycle carrier, and snapped thereover in the region of the load-carrying area, thus completely covering any metal projections. In order to enable use of such a carrier also as a seat, the customary holding or latching spring is omitted and, rather, the integral molding has a latch or hook member molded thereon, to match a similar latching member connected to a holding strap.

Providing an integral covering for the entire metal frame, as one single molding, enables covering of all metal parts which are liable to cause injury. Additionally, the metallic parts which are subject to greatest wear, that is the parts on top, are further covered by the plastic and thus are less liable to rust. Additionally, the present construction permits use of the cheaper galvanizing covering rather than the customary chrome, since the generally horizontal, load-carrying area of the bicycle carrier is covered by plastic presenting a pleasing appearance and the otherwise less attractive galvanized covering is hidden. The plastic can be of any color, for example, to match or to contrast with the frame of the bicycle with which it is to be used. The combination of colored plastic and galvanized metal is particularly pleasing.

Ordinarily, and in order to cut production costs, bicycle carriers usually consist of a pair of longitudinal (with respect to the frame of the bicycle) rails which are secured to the axle or shaft of the rear wheel of the bicycle. The rails are united in the center and at their point of connection they are secured to the frame of the bicycle, usually somewhat below the seat. The rails may also be bent of one integral piece of material, with a U-bend being formed at the point of connection to the frame beneath the seat. In order to provide rigidity, a plurality of cross-braces are then welded, usually spot welded to the rails to interconnect the same. In an alternative construction, the rails may be of hollow tubing and the cross-braces inserted into holes in the hollow tubing. This, however, increases production costs. Since, when welding the cross-braces, they must be placed above or below the longitudinal rails, the load-carrying surface formed by the lowest cost carriers will not be even, because of the difference in height between the cross-braces and the longitudinal rails. The plastic molding, in accordance with the present invention, is shaped in such a manner to account for the difference in height between the longitudinal rails and the cross-braces and thus present a uniform, flat load-carrying surface. When the cross-braces are secured below the rails, the load-carrying surface of the molding will be just above, by a suitable thickness, the top surface of the rail; that is, the top surface will be defined by the location of the longitudinal rails. When, however, the cross pieces are welded to the rails thereabove, then the plastic will be thicker in the region where it bears against the rails and the upper surface of the plastic moulding will be defined by the upper surface of the cross-braces. Thus, by providing a flat load-carrying plane, the carrier according to the present invention can readily be used as an additional seat for children.

Manufacture of the integral molding is simple, since only a single piece is involved. The molding is formed with grooves in the region of the metal rails and crosspieces, which grooves can be slightly smaller, or have a slightly smaller area just at their entrance, so that the molding can be snapped over the metal assembly. It has been found that manufacturing the entire carrier of plastic is not suitable, since the load-carrying capability of plastics at a competitive price range would be insufficient for children of such age that they could use bicycles.

The structure, organization, and operation of the invention will now be described more specifically in the following detailed description with reference to the accompanying drawings, in which:

FIG. 1 is a bicycle carrier, according to the present invention, in a perspective view;

FIG. 2 is a perspective view of an attachment latch for a strap to be used with the carrier;

FIG. 3 is the rear attachment plate for the strap;

FIG. 4 is a transverse cross-sectional view along line IV—IV of FIG. 1;

FIG. 5 is a vertical longitudinal sectional view along lines V—V of FIG. 6; and

FIG. 6 is a view similar to FIG. 5 showing a different embodiment of the present invention.

The carrier 1 has the usual longitudinal rails 2, 2′, and cross-braces 3, forming a load-carrying surface. They are completely covered by an integral molding 4, consisting of thermoplastic, which completely surrounds both the rails and the cross-braces from the top and from the sides, and which is matched to the shape of the rails and the cross-braces. The molding may be given slightly enlarged, and rounded-off forms to present a pleasing appearance, as seen, for example, at 14.

The lower portion of the molding 4 is formed with grooves 5 into which the rails 2, 2' and the crosspieces 3 fit. Grooves 5 are dimensioned in such a manner that their side walls slightly resiliently deform so that the metal frame fits with a press fit therein. The bottom edge of the grooves 5 may be formed to converge slightly so as to provide a definite snap-in fit.

Carriers, in which the cross-braces 3 are welded to the top fo the longitudinal rails 2, 2' provide in general for a load-carrying surface which is defined by the top of the cross-braces 3. Such a carrier is shown in FIG. 5. The thickness of the plastic material, in the region of the rails 2, 2' is thus chosen such that the top of the plastic molding 4 is even throughout. Carriers, in which the cross-braces are welded below the longitudinal rails 2, 2' are shown in FIG. 6 and in this instance the top, load-carrying surface of the molding 4 is governed by the upper edge of the longitudinal cross-braces 2, 2'.

Since carriers, according to the present invention, may be used as a seat for children, and further to present a pleasing appearance, it is desirable to omit the customary holding spring in order to prevent possible injury when mounting the carrier, and to provide for the smooth load-carrying surface. It is rather preferred to utilize a removable holding strap. Such a holding strap preferably contains a handle 7, with a latch or hook 8 attached thereto (see FIG. 2) for which a counterlatch element 9 is provided, and integral with the carrier covering molding, as seen in FIG. 1. Latch hook 8 fits over the projection 9. To provide for easy insertion and removability, the other end of the strap 6 is preferably secured to a holding plate 10, for example by being passed through a slit 9. Holding plate 10 is performed with a pair of recesses to engage around the ordinary holding screws 13, passed through the carrier attachment plate 11 customarily secured just beneath the saddle to the frame of the bicycle. Length of the strap is preferably made to be adjustable, as indicated schematically by buckle 15, FIG. 2.

I claim:

1. A cycle carrier having a metal frame, said frame having attachment portions to secure the frame to the cycle, and a load-carrier portion, said load-carrier portions comprising a pair of longitudinally extending rails (2, 2');

cross-braces interconnecting said rails;

and a cover for said rails and cross-braces formed as an integral molding (4) of plastic material entirely surrounding the top and the sides of the cross-braces (2, 2', 3) and the longitudinal rails, said molding (4) being formed with a groove (5) in the underside thereof and matching said rails (2, 2') and cross-braces (3) to receive said rails and cross-braces and to be secured thereover.

2. Cycle carrier as claimed in claim 1, where said groove (5) is dimensioned to receive said rails (2, 2') and cross-braces (3) with a press fit.

3. Cycle carrier as claimed in claim 1, in combination with a holding strap (6) having a latch (8), said molding (4) being formed with a latch extension integrally molded thereto and matching said latch (8) on said strap.

4. Cycle carrier as claimed in claim 3, wherein said strap has said latch (8) matching the latch on said molded cover (4) at one end thereof; a pair of attachment screws (13) are provided for said carrier to secure said carrier to a bicycle; and a holding plate (10) is provided at the other end of said strap, said holding plate (10) being formed with openings (12) matching the spacing of said attachment screws (13).

References Cited

UNITED STATES PATENTS

| 2,142,361 | 2/1939 | Bloomberg | 224—31 |
| 2,980,162 | 4/1961 | Bourgois | 297—195 |
| 3,054,643 | 9/1962 | Militano. | |
| 3,291,522 | 12/1966 | Horowitz et al. | 297—195 |

FOREIGN PATENTS

| 457,219 | 11/1936 | Great Britain. |
| 90,997 | 4/1959 | Netherlands. |

ROBERT G. SHERIDAN, *Primary Examiner.*

R. BALLANTYNE, *Assistant Examiner.*